(No Model.)
C. B. HURLBUT.
End Board Fastening for Wagons.
No. 232,129.  Patented Sept. 14, 1880.
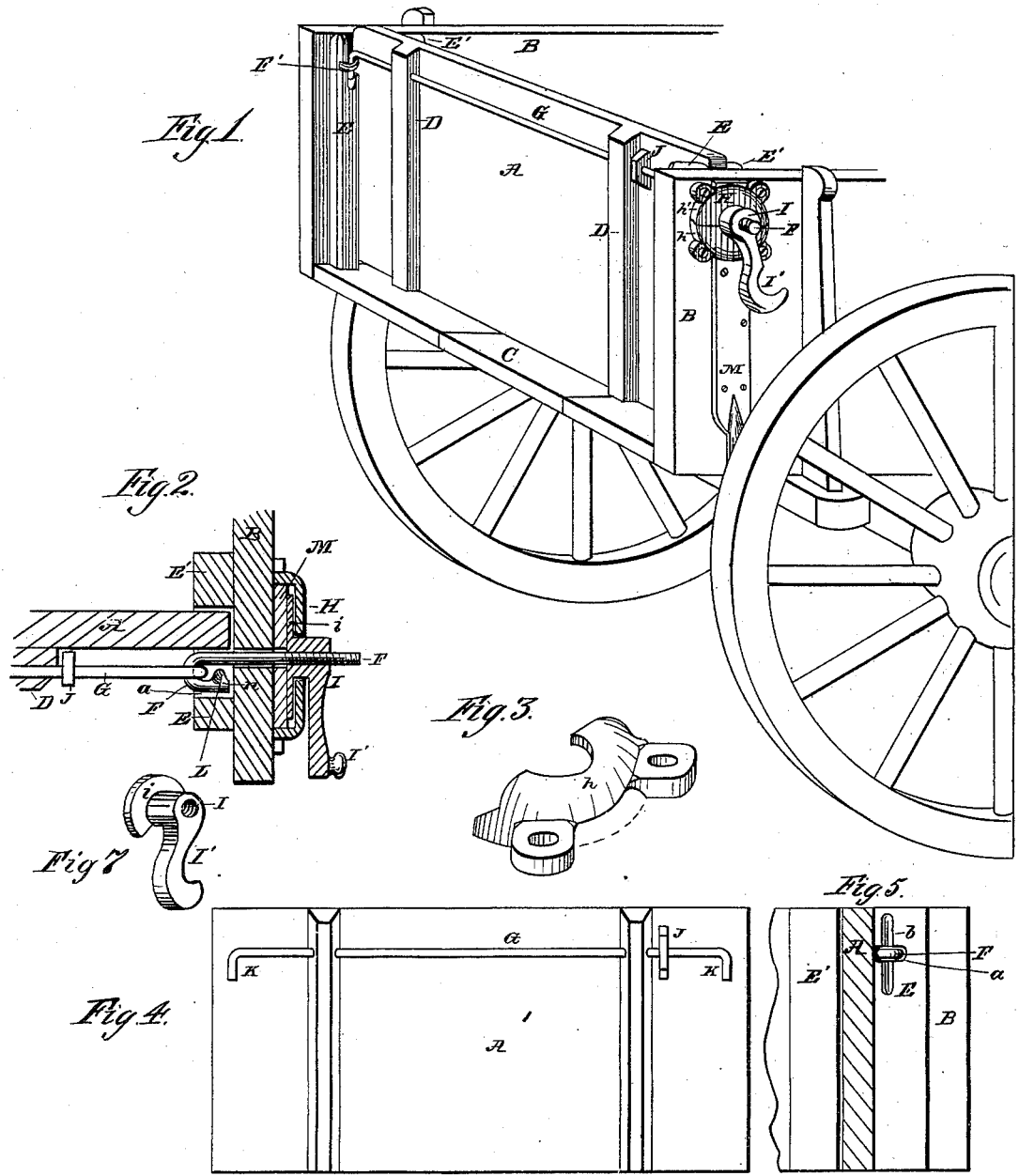
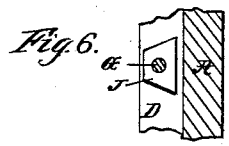
Witnesses—
F. B. Townsend
W. C. Adams
Inventor—
Charles B. Hurlbut
per M. E. Dayton
Attorney

UNITED STATES PATENT OFFICE.

CHARLES B. HURLBUT, OF RACINE, WISCONSIN.

END-BOARD FASTENING FOR WAGONS.

SPECIFICATION forming part of Letters Patent No. 232,129, dated September 14, 1880.

Application filed May 17, 1880. (No model.)

*To all whom it may concern:*

Be it known that I, CHARLES B. HURLBUT, of Racine, in the county of Racine and State of Wisconsin, have invented certain new and useful Improvements in End-Board Fastenings for Wagons; and I do hereby declare that the following is a full, clear, and exact description thereof, reference being had to the accompanying drawings, and to the letters of reference marked thereon, which form a part of this specification.

This invention relates to appliances for securing end-boards of wagon boxes or beds removably in place; and it consists in the devices hereinafter described, and pointed out in the claims.

In the drawings, Figure 1 is a perspective view of the rear end of a wagon-bed in which the end-board is held by my improved appliances. Fig. 2 is a horizontal section of the end-board and side-board of the wagon-box through the fastening-nut. Fig. 3 is a perspective view of one-half the divided cap which is applied to the box to hold the nut in place. Fig. 4 is an elevation of an end-board detached from the box. Fig. 5 is an inner view of the side-board, showing the end-board in vertical section near the side-board. Fig. 6 is a fragmentary view of the end-board in vertical section, near one of the cleats thereon. Fig. 7 is a perspective view of the clamp-nut detached.

A is the end-board, B B are the side-boards, and C is the bottom board, of a wagon-bed.

D D are the ordinary cleats, fastened vertically to the end-board.

G is a rod, somewhat shorter than the end-board, passing through the cleats D, and provided at its ends with the vertically-depending hooks K.

J is a stop fastened to the rod G, preferably near one of the cleats D, and is intended, by its broad inner face, in proximity with the end-board, to hold the rod G from turning and to keep the hooks *k* vertical. Said rod G is movable longitudinally in the cleats which support it.

F and F' are eyebolts protruding on the inner face of the side-boards, in position to receive the hooks K when the end-board is dropped into place. One of these eyebolts, F', is fixed; the other, F, is movable, and, as clearly shown in Fig. 1, has its shank or tang threaded to receive the nut I. Said nut I is provided with an outer arm, I', by which it may be readily turned to tighten or loosen the eyebolt F upon the hook K of the rod G. Said nut I is also provided with a flange, *i*, which bears against the outer face of the side-board or against the tie-plate M. The cap-plate H, secured by screws to the side-board, embraces the nut I between the flange *i* and the arm I', and thereby holds said nut from outward and inward movement while being turned. As a result of the stationary position thus given to the nut I, the eyebolt F is forced inward and outward by the rotation of the nut.

In order to prevent the movable eyebolt F from turning, and to hold the eye of the same always in a horizontal position to receive the hook K, I prefer to make said eyebolt in the form indicated in Fig. 2, wherein the return portion *n* is parallel with the main portion or tang. The eye part of the bolt being let into a slot, *a*, (better shown in Fig. 5,) it is thereby held in a horizontal position when run outward or inward any necessary distance to tighten or release the hooked rod G.

To avoid the necessity or danger of removing the eye out of slot *a* the cleat E may be grooved, as shown at *b*, Fig. 5, to admit the hook K of the tie-rod G.

To facilitate the application of the outer holding-plate, H, so as to closely embrace the nut I between its flange *i* and arm I', and to thereby hold the same steadily in its place, I make the said plate in two parts, *h* and *h'*, (one of which is shown detached in Fig. 3,) and apply the same as shown in Fig. 1.

The operation of the fastening is obvious. The rod G remains permanently attached to the end-board, and the hooks K drop into or lift out of the eyebolts F and F' when the end-board is inserted into or removed from the box. Having inserted the end-board between the cleats E and E', the nut I is turned to throw out the eyebolt F, which draws on the rod G and upon the opposite eyebolt or staple, F', so as to clamp the side-boards firmly against the end-board, securing the latter in place and giving rigidity to the entire box. This clamping effect mentioned results from the longitudinal movement of the rod G in the cleats. The end-board might be equally held in place by separate hooks, one at each end of the board A; but to bind the end-board to both side-boards would, in that case, require a nut, I, at each side of the box. Wherefore I prefer the construction shown, wherein, as explained, the rod is movable lengthwise in the cleats D. The nut being turned in the opposite direction, the hooks K are released, and the end-board may be lifted out of the box. In slacking the nut I the projection L strikes the hook K and slides the rod G in the cleats D, thereby perfectly freeing the opposite hook K in the eyebolt F'.

If desired, the hooks K may be inclined inward slightly from the vertical to more positively engage with the eyebolts.

While the stop J on the rod G may, for the purpose of preventing said rod from turning, be located at any point thereon, it may, by placing it near one of the cleats D, as shown, also serve to limit the endwise movement of the rod, so that by pushing the rod until the stop J strikes the cleat the hooks K are quickly brought in proper position to enter the eyebolts F and F'.

The nut I and eyebolt F are preferably double threaded, so as to give rapid movement to the bolt when the nut is turned, in order that the operation of tightening or loosening the fastening may be quickly performed.

Having thus described my invention, I claim—

1. In combination, the end-board provided with the longitudinally-movable rod G, having hooks K at its ends, and the side-boards provided, one with the fixed eyebolt F', and the other with the movable bolt F and nut I, held from outward and inward movement by means substantially as described, whereby when the nut is turned the bolt is moved and the rod G secured or released, substantially as and for the purposes set forth.

2. In combination with the movable bolt F of the end-board fastening described, consisting of the nut I, provided with the flange $i$ and arm I', and the holding-plate H, operating to hold the nut stationary to the sideboard, and to thereby force the bolt F inward when the nut is turned, substantially as and for the purposes set forth.

3. In combination with the external stationary nut, I, the movable bolt F, arranged with its eye in a horizontal slot, $a$, in the cleat E, so as to be held thereby in a horizontal position to receive the hook K on the end-board, substantially as described.

4. In combination with the stationary nut I, the stationary eye F' and movable rod G, having hooks K, the eyebolt F, having the projection or shoulder L, whereby when the bolt F is thrown inward the rod is freed in the eye F', substantially as set forth.

5. In combination with the rod G, having the hooks K, intended to drop into the eyes F and F', the stop J, adapted to hold the rod from turning and to keep the hooks K parallel with the end-board, substantially as described.

6. In combination with the longitudinally-moving rod G, having hooks K, intended to enter the eyes F and F', and with the cleat D of the end-board, the stop J, arranged upon the rod to strike the cleat and to thereby arrest the hooks in position to enter the eyes aforesaid when the end-board is inserted, substantially as described.

In testimony that I claim the foregoing as my invention I affix my signature in presence of two witnesses.

CHAS. B. HURLBUT.

Witnesses:
M. E. DAYTON,
W. C. ADAMS.